United States Patent
Sisto et al.

(10) Patent No.: US 11,182,433 B1
(45) Date of Patent: Nov. 23, 2021

(54) NEURAL NETWORK-BASED SEMANTIC INFORMATION RETRIEVAL

(71) Applicant: Searchable AI Corp, San Francisco, CA (US)

(72) Inventors: Aaron Sisto, Oakland, CA (US); Nick Martin, Saint Augustine, FL (US); Brian Shin, Reno, NV (US); Hung Nguyen, St. Rafael, CA (US)

(73) Assignee: Searchable AI Corp, San Francisco, CA (US)

( * ) Notice: Subject to any disclaimer, the term of this patent is extended or adjusted under 35 U.S.C. 154(b) by 0 days.

(21) Appl. No.: 17/323,465

(22) Filed: May 18, 2021

Related U.S. Application Data

(60) Provisional application No. 62/029,120, filed on Jul. 25, 2014.

(51) Int. Cl.
  *G10L 15/00* (2013.01)
  *G06F 16/9032* (2019.01)
  *G06F 40/30* (2020.01)
  *G06N 3/04* (2006.01)
  *G06K 9/34* (2006.01)

(52) U.S. Cl.
  CPC ........ *G06F 16/90332* (2019.01); *G06F 40/30* (2020.01); *G06K 9/344* (2013.01); *G06N 3/04* (2013.01); *G06K 2209/01* (2013.01)

(58) Field of Classification Search
  CPC ..... G06F 16/90332; G06F 40/30; G06N 3/04; G06K 9/344; G06K 2209/01
  USPC .............. 704/231; 707/3, 999.103, E17.009, 707/999.003, E17.083; 706/12; 715/210; 382/181
  See application file for complete search history.

(56) References Cited

U.S. PATENT DOCUMENTS

| | | | |
|---|---|---|---|
| 8,761,512 B1 * | 6/2014 | Buddemeier | G06K 9/6282 382/181 |
| 2006/0106767 A1 * | 5/2006 | Adcock | G06F 40/30 |
| 2007/0192293 A1 * | 8/2007 | Swen | G06F 16/338 |
| 2009/0327850 A1 * | 12/2009 | Obrecht | G06F 40/103 715/210 |
| 2013/0311409 A1 * | 11/2013 | Ye | G06N 20/00 706/12 |
| 2016/0357851 A1 | 12/2016 | Perkins et al. | |
| 2016/0371263 A1 | 12/2016 | Carus | |
| 2019/0108276 A1 | 4/2019 | Kovacs et al. | |
| 2019/0108277 A1 | 4/2019 | Taneja et al. | |

(Continued)

Primary Examiner — Charlotte M Baker
(74) Attorney, Agent, or Firm — David H. Judson

(57) ABSTRACT

A question and answer (Q&A) system is enhanced to support natural language queries into any document format regardless of where the underlying documents are stored. The Q&A system may be implemented "as-a-service," e.g., a network-accessible information retrieval platform. Preferably, the techniques herein enable a user to quickly and reliably locate a document, page, chart, or data point that he or she is looking for across many different datasets. This provides for a unified view of all of the user's (or, more generally, an enterprise's) information assets (such as Adobe® PDFs, Microsoft® Word documents, Microsoft Excel spreadsheets, Microsoft PowerPoint presentations, Google Docs, scanned materials, etc.), and to be able to deeply search all of these sources for the right document, page, sheet, chart, or even answer to a question.

18 Claims, 5 Drawing Sheets

(56) References Cited

U.S. PATENT DOCUMENTS

| | | |
|---|---|---|
| 2019/0138538 A1 | 5/2019 | Stojanovic et al. |
| 2019/0278813 A1 | 9/2019 | Venugopal et al. |
| 2019/0286898 A1 | 9/2019 | Powell et al. |

* cited by examiner

NEURAL NETWORK-BASED SEMANTIC INFORMATION RETRIEVAL

BACKGROUND

Technical Field

This application relates generally to information retrieval methods and systems.

Background of the Related Art

A search engine is an information retrieval software program that discovers, crawls, transforms and stores information for retrieval and presentation in response to user queries.

A search engine normally comprises several components including a search interface, a crawler (also known as a spider or bot), an indexer, and a database. The crawler traverses a document collection, deconstructs document text, and assigns surrogates for storage in the search engine index. Online search engines store images, link data and metadata for the document as well. Search engines on the web (e.g., Google®) are sites enriched with facility to search the content stored on other sites. There is difference in the way various search engines work, but they all perform three basic tasks: finding and selecting full or partial content based on the keywords provided, maintaining an index of the content and referencing to the location they find, and allowing users to look for words or combinations of words found in that index.

Multimedia data information retrieval is complex. In part, this is because multimedia data comes in a variety of formats, and each format encodes information differently. Common information retrieval techniques, such as conventional keyword searching, are useful but typically are just configured to finding a responsive web page or document. An alternative to keyword matching is vector-based searching. These algorithms ingest information and turn it into a numerical format that can be used for further filtering and information retrieval. Approaches using document term frequencies, term-document matrices, and other domain-specific adaptations to assess the similarity between queries and documents have been in practice for over a decade with incremental improvements.

Question answering (or "question and answering," or "Q&A") is another type of information retrieval. Given a collection of documents, a Q&A system is configured to retrieve answers to questions posed in natural language. Q&A is regarded as requiring more complex natural language processing (NLP) techniques than other types of information retrieval, such as document retrieval, and it is sometimes regarded as the next step beyond search engines. Closed-domain question answering deals with questions under a specific domain, and it can be seen as an easier task because NLP systems can exploit domain-specific knowledge frequently formalized in ontologies. Open-domain question answering deals with questions about nearly everything, and they can only rely on general ontologies and world knowledge. These systems usually have much more data available from which to extract the answer. Systems of this type are implemented as a computer program, executed on a machine. Typically, user interaction with such a computer program either is via a single user-computer exchange, or a multiple turn dialog between the user and the computer system.

Such dialog can involve one or multiple modalities (text, voice, tactile, gesture, or the like). The challenge in building such a system is to understand the query, to find appropriate documents that might contain the answer, and to extract the correct answer to be delivered to the user.

In the past, understanding the query was an open problem because computers do not intrinsically have human ability to understand natural language, nor do they have common sense to choose from many possible interpretations that elementary natural language understanding systems can produce. There are known solutions that addresses this problem based on a NLP artificial intelligence (AI)-based learning machine. A machine of this type may combine natural language processing, machine learning, and hypothesis generation and evaluation; it receives queries and provides direct, confidence-based responses to those queries. A Q&A solution may be cloud-based, with the Q&A function delivered "as-a-service" (SaaS) that receives Natural language-based queries and returns predicted answers.

A representative Q&A system provides answers to questions based on any corpus of textual data. In this approach, a number of candidate passages are generated from the corpus that answer an input query, and the machine finds the correct resulting answer by collecting supporting evidence from the multiple passages. By analyzing all retrieved passages and that passage's metadata in parallel, there is generated an output plurality of data structures including candidate answers based upon the analyzing step. Then, by each of a plurality of parallel operating modules, supporting passage retrieval operations are performed upon the set of candidate answers; for each candidate answer, the data corpus is traversed to find those passages having candidate answer in addition to query terms. All candidate answers are automatically scored causing the supporting passages by a plurality of scoring modules, each producing a module score. The modules scores are processed to determine one or more query answers; and, a query response is generated for delivery to a user based on the one or more query answers. An alternative Q&A system may be implemented using natural language processing technology that allows applications to process natural language text. A system of this type comprises a set of libraries that provide various NLP functions such as language identification, text segmentation and tokenization, normalization, entity and relationship extraction, and semantic analysis.

BRIEF SUMMARY

According to this disclosure, a Q&A system is enhanced to support natural language queries into any document format regardless of where the underlying documents are stored. The Q&A system may be implemented "as-a-service," e.g., a network-accessible information retrieval platform. Preferably, the techniques herein enable a user to quickly and reliably locate a document, page, chart, or data point that he or she is looking for across many different datasets. This provides for a unified view of all of the user's (or, more generally, an enterprise's) information assets (such as Adobe® PDFs, Microsoft® Word documents, Microsoft Excel spreadsheets, Microsoft PowerPoint presentations, Google Docs, scanned materials, etc.), and to be able to deeply search all of these sources for the right document, page, sheet, chart, or even answer to a question. The question (or, more generally, the query) may be posed in natural language, but this is not a limitation. For example, a user can search for the version of a spreadsheet that contains the data he or she needs, or he or she can actually search at a more fine-grained level, e.g., for a particular answer contained in this spreadsheet. To continue with this example, the user can ask the system (using natural language) "what is the food budget for Squadron II for Q2 2020," and receive a response, such as "we believe the budget is $225,000 as found in Document XYZ."

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
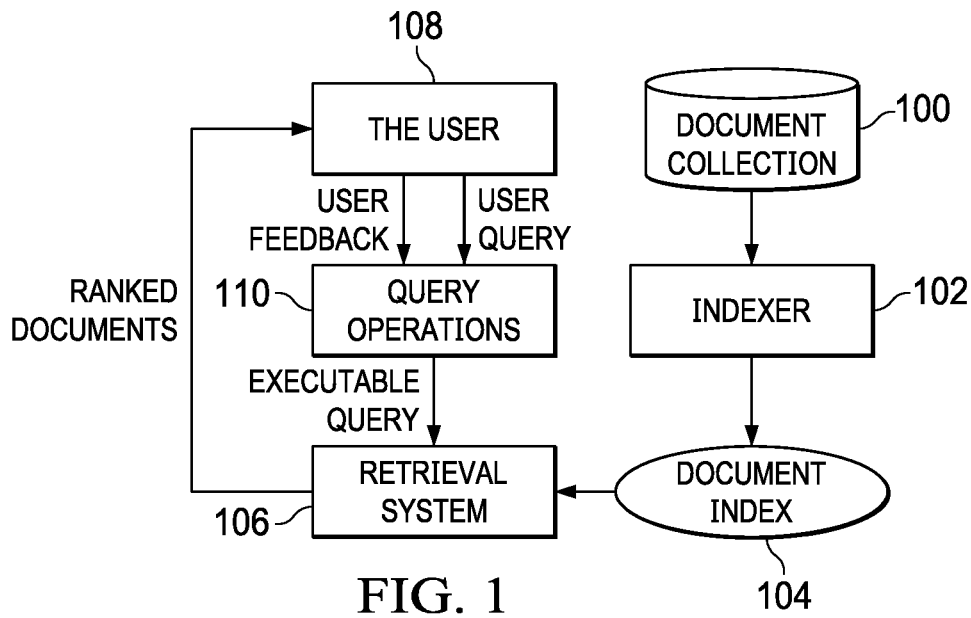
FIG. 1 is a block diagram depicting an information retrieval system in which the technique of this disclosure may be implemented.

FIG. 1 depicts a representative information retrieval system in which the techniques of this disclosure may be implemented. In this approach, and as will be described, relevant documents are collected/received and stored in a document collection 100. An indexer 102 is applied to the document collection to produce a document index 104. The document index 104 is used by a retrieval system 106 in response to receipt from a user 108 of a user query. In particular, the user query is processed by query operations 110 and results in an executable query that is applied to the retrieval system 106, with the result being returned to the user. The user may also provide feedback to the query operations 110. As will be described, the approach is provided in a question-answer system that is configured for computational and storage efficiencies.

Preferably, a network-accessible computing platform executes the basic search functionality as will be described. Typically, the computing platform is managed and operated "as-a-service" by a service provider entity. The platform typically is accessible over the public Internet at a particular serviceprovider.com domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid.

The system may be implemented on-premises (e.g., in an enterprise network), in a cloud computing environment, or in a hybrid infrastructure. An individual end user typically accesses the system using a user application executing on a computing device (e.g., mobile phone, tablet, laptop or desktop computer, Internet-connected appliance, etc.). In a typical use case, a user application is a mobile application (app) that a user obtains from a publicly-available source, such as a mobile application storefront. The platform may be managed and operated by a service provider. Although typically the platform is network-accessible, e.g., via the publicly-routed Internet, the computing system may be implemented in a standalone or on-premises manner. In addition, one or more of the identified components may interoperate with some other enterprise computing system or application.

Preferably, the platform supports a machine learning system. The nature and type of Machine Learning (ML) algorithms that are used to process the query may vary. As is known, ML algorithms iteratively learn from the data, thus allowing the system to find hidden insights without being explicitly programmed where to look. ML tasks are typically classified into various categories depending on the nature of the learning signal or feedback available to a learning system, namely supervised learning, unsupervised learning, and reinforcement learning. In supervised learning, the algorithm trains on labeled historic data and learns general rules that map input to output/target. The discovery of relationships between the input variables and the label/target variable in supervised learning is done with a training set, and the system learns from the training data. In this approach, a test set is used to evaluate whether the discovered relationships hold and the strength and utility of the predictive relationship is assessed by feeding the model with the input variables of the test data and comparing the label predicted by the model with the actual label of the data. The most widely used supervised learning algorithms are Support Vector Machines, linear regression, logistic regression, naive Bayes, and neural networks. As will be described, the techniques herein preferably leverage a network of neural networks. Formally, a NN is a function g: X→Y, where X is an input space, and Y is an output space representing a categorical set in a classification setting (or a real number in a regression setting). For a sample x that is an element of X, $g(x)=f_L(F_{L-1}(\ldots((f_1(x))))$. Each $f_i$ represents a layer, and $F_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes.

In unsupervised machine learning, the algorithm trains on unlabeled data. The goal of these algorithms is to explore the data and find some structure within. The most widely used unsupervised learning algorithms are Cluster Analysis and Market Basket Analysis. In reinforcement learning, the algorithm learns through a feedback system. The algorithm takes actions and receives feedback about the appropriateness of its actions and based on the feedback, modifies the strategy and takes further actions that would maximize the expected reward over a given amount of time.

The following provides additional details regarding supervised machine learning. As noted above, supervised learning is the machine learning task of inferring a function from labeled training data. The training data consist of a set of training examples. In supervised learning, typically each example is a pair consisting of an input object (typically a vector), and a desired output value (also called the supervisory signal). A supervised learning algorithm analyzes the training data and produces an inferred function, which can be used for mapping new examples. An optimal scenario allows for the algorithm to correctly determine the class labels for unseen instances. This requires the learning algorithm to generalize reasonably from the training data to unseen situations.

For supervised learning, the following steps are used. An initial determination is what kind of data is to be used as a training set. The training set is then gathered. In particular, a set of input objects is gathered and corresponding outputs are also gathered, either from human experts or from measurements. Then, an input feature representation of the learned function is determined. In this approach, typically the input object is transformed into a feature vector, which contains a number of features that are descriptive of the object. The structure of the learned function and corresponding learning algorithm are then determined. For example, support vector machines or decision trees may be used. The learning algorithm is then run on the gathered training set. Some supervised learning algorithms require a user to determine certain control parameters. These parameters may be adjusted by optimizing performance on a subset (called a validation set) of the training set, or via cross-validation. The accuracy of the learned function is then evaluated. After parameter adjustment and learning, the performance of the resulting function is measured on a test set that is separate from the training set.

Figure 2:
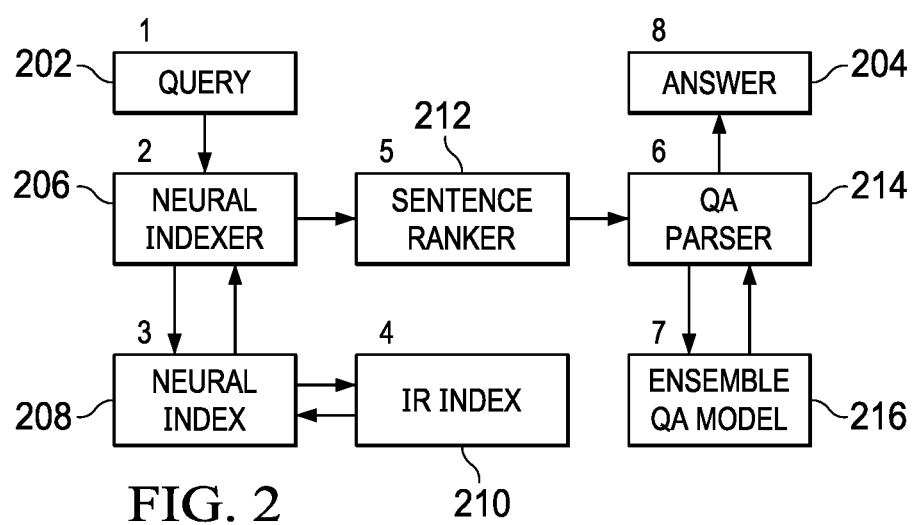
FIG. 2 is a representative question-answer interaction provided by the system.

A representative Q&A request and response using the technique of this disclosure is depicted in FIG. 2. The system comprises a set of high level components including a query component 202, and an answer component 204. These components may be one and the same (e.g., a web-based interface, a web page, or the like). The system also includes a neural indexer 206 that creates a neural index 208, together with an information retrieval search (IR) index 210. Generalizing, the IR index is any generic, open-source datastore, such as a distributed, NoSQL database with a rich, full-text interface (e.g., Lucene) to facilitate programmatic retrieval of relevant documents and content. The indexes are structured as databases, arrays, linked lists, or other data structures. Other components include a sentence ranker 212, a Q/A parser 214, and an ensemble Q/A data model 216. At step (1), a user enters a search query, e.g., on a client application search bar of the query component 202. A representative query string is "What were 2019 sales for Acme?" At step (2), the query is received at the neural indexer 206. The query string is embedded by the neural indexer using a deep learning model. Thus, for example, a neural network can transform a text string "abc" into a vector, such as [1.0, 1.232, 2.232, 5.2823, . . . ]; this query vector is sometimes referred to herein as an embedding vector, which is n-dimensional, and it represents an internal representation of the text string that can be processed by the neural network. At step (3), and using the neural index 208, the query string is compared to information previously stored, e.g., all sentences in every file that has been uploaded by the user previously. The sentences have been previously processed into one more vectors in a similar manner as the way in which the query is processed into the embedding vector. Preferably, these files are embedded in the same vector space at upload. During this step, the neural index 208 finds the most relevant sentences and the pages that contain them. In a representative embodiment, relevance in this context means that there is a degree of similarity between the query vector and every sentence vector (or some given defined set of them) that is stored. Similarity may be determined by an algorithm like cosine similarity that directly compares the query and document vectors. In document clustering, two document vectors are compared to assess their similarity. When the user uploads files to the system, preferably each sentence is embedded and stored as a vector in the neural index 206 and is also stored as a reference in its original form in the IR search index 208. At step (5), and using a deep learning model, each sentence string retrieved from the IR search index 208 is ranked by the sentence ranker 212 based on the probability that it contains the answer to the user's query. At step (6), a top N number of sentences (based on the ranking) are extracted and prepared by the Q/A parser 214 for input to the ensemble Q/A model 216. At step (7), the user's query and each candidate sentence (provided by the sentence ranker) are provided to one or more deep learning models, with each of the models predicting a best phrase or passage that is believed to answer the query. The results are then combined in the Q/A model 216 to find a best answer across all data models in the ensemble. At step (8), the answer to the user's query is provided to the answer component 204 and output to the user, preferably together with one or more of the source files that were examined.

Figure 3:
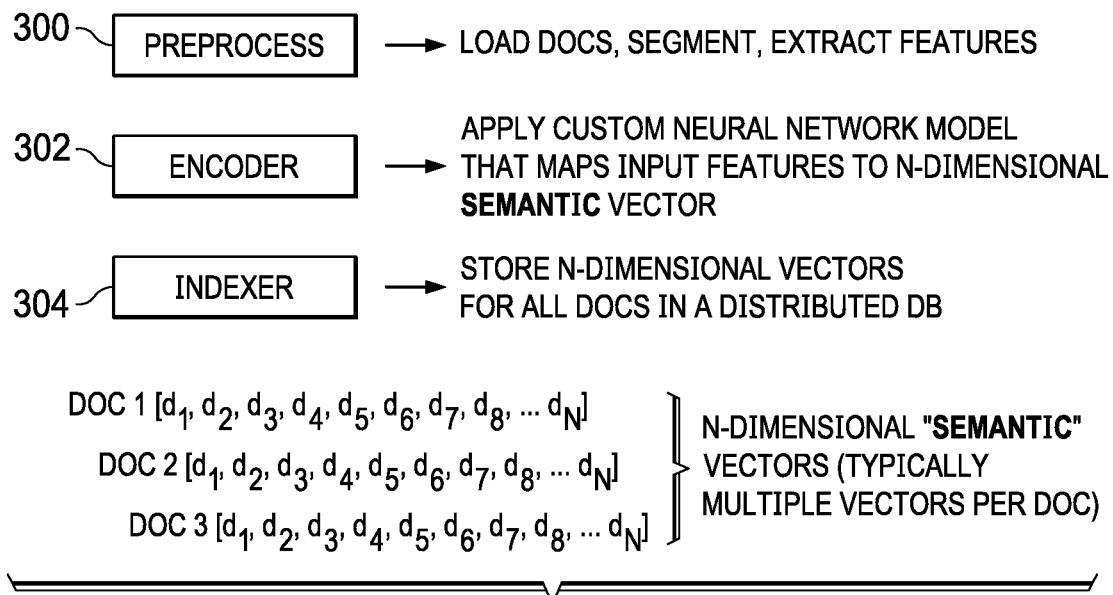
FIG. 3 depicts a neural indexing component of the system.

FIG. 3 depicts a representative implementation of the neural indexing component 204. The neural indexer comprises a preprocessor 300, an encoder 302, and an indexer 304. The preprocessor 300 loads the source materials (e.g., documents), segments the text, and extracts feature data. The encoder 302 applies a neural network model to a feature data set, thereby mapping input features to an n-dimensional semantic vector. Typically, a document is mapped to at least one vector; in an alternative embodiment the document is mapped to a separate n-dimensional vector for each sentence or object (in the case of images) in the document. There is constraint on the vector size, except that vectors should be large enough to capture the semantic analysis used to calculate similarity. The indexer 304 stores the resulting set of n-dimensional vectors for all documents indexed in this manner, preferably in a distributed database.

Figure 4:
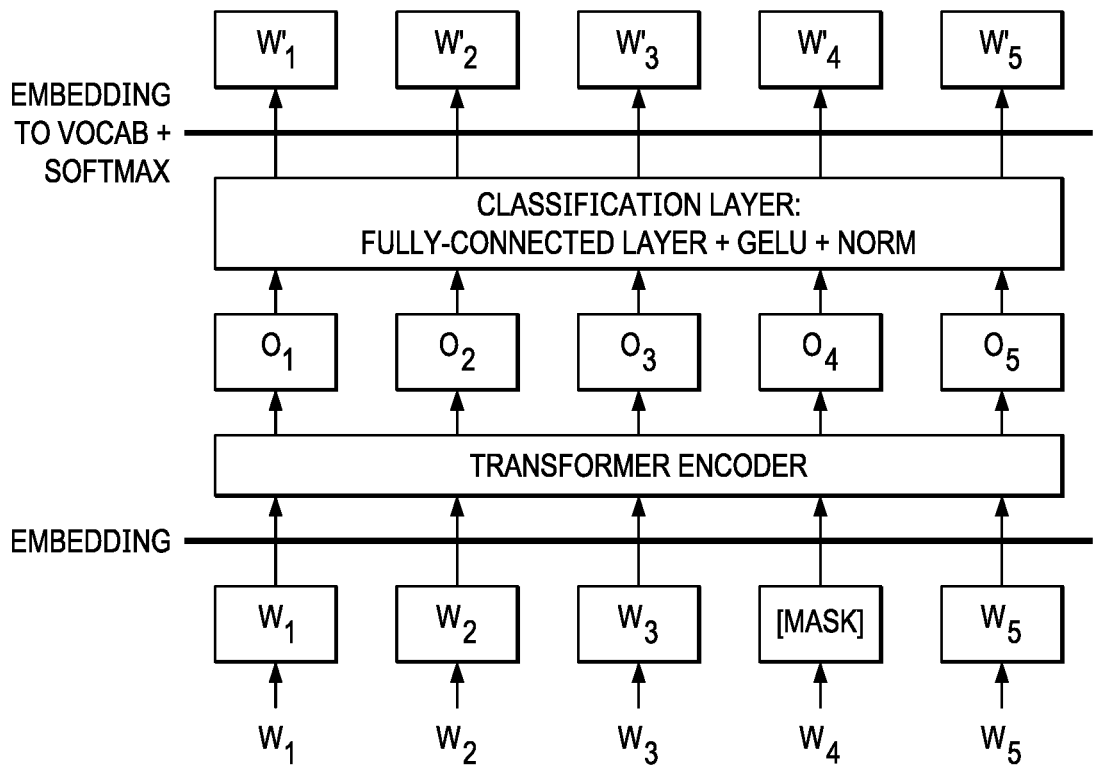
FIG. 4 depicts the encoder subcomponent of the neural indexing component of FIG. 3.

FIG. 4 depicts the encoder 302 of FIG. 3. As described, the encoder applies the neural network model to map input features to n-dimensional semantic vectors. Preferably, the encoder encodes contextual, semantic information about each sentence in each document. It captures high-level concepts and relationships between and among words across sentences. Preferably, the encoder also captures syntactic variability, e.g., synonyms, hypernyms, and the like, and it can be trained/refined on a per-user/per-query basis.

Figure 5:
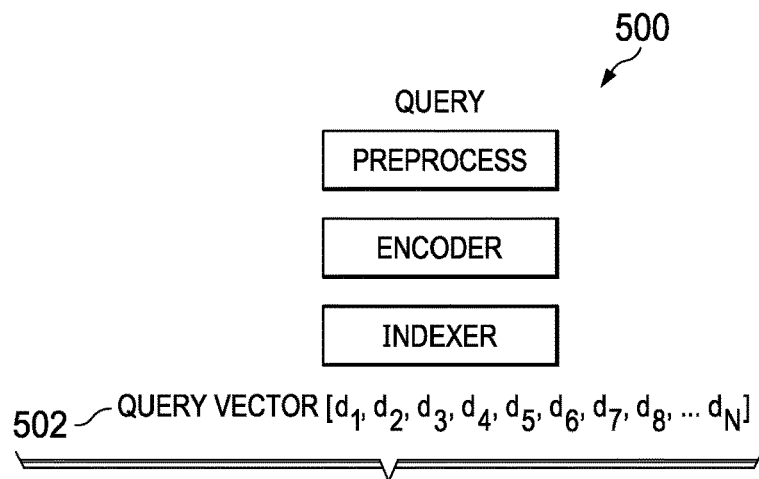
FIG. 5 depicts how a query is transformed into an n-dimensional semantic query vector.

Preferably, the query component processes the query (to produce the n-dimensional semantic vector for the query) using the neural indexing. This is depicted in FIG. 5 for query 500, with it resulting n-dimensional query vector 502 provided by the neural indexing component (preprocessor, encoder and indexer).

Figure 6:
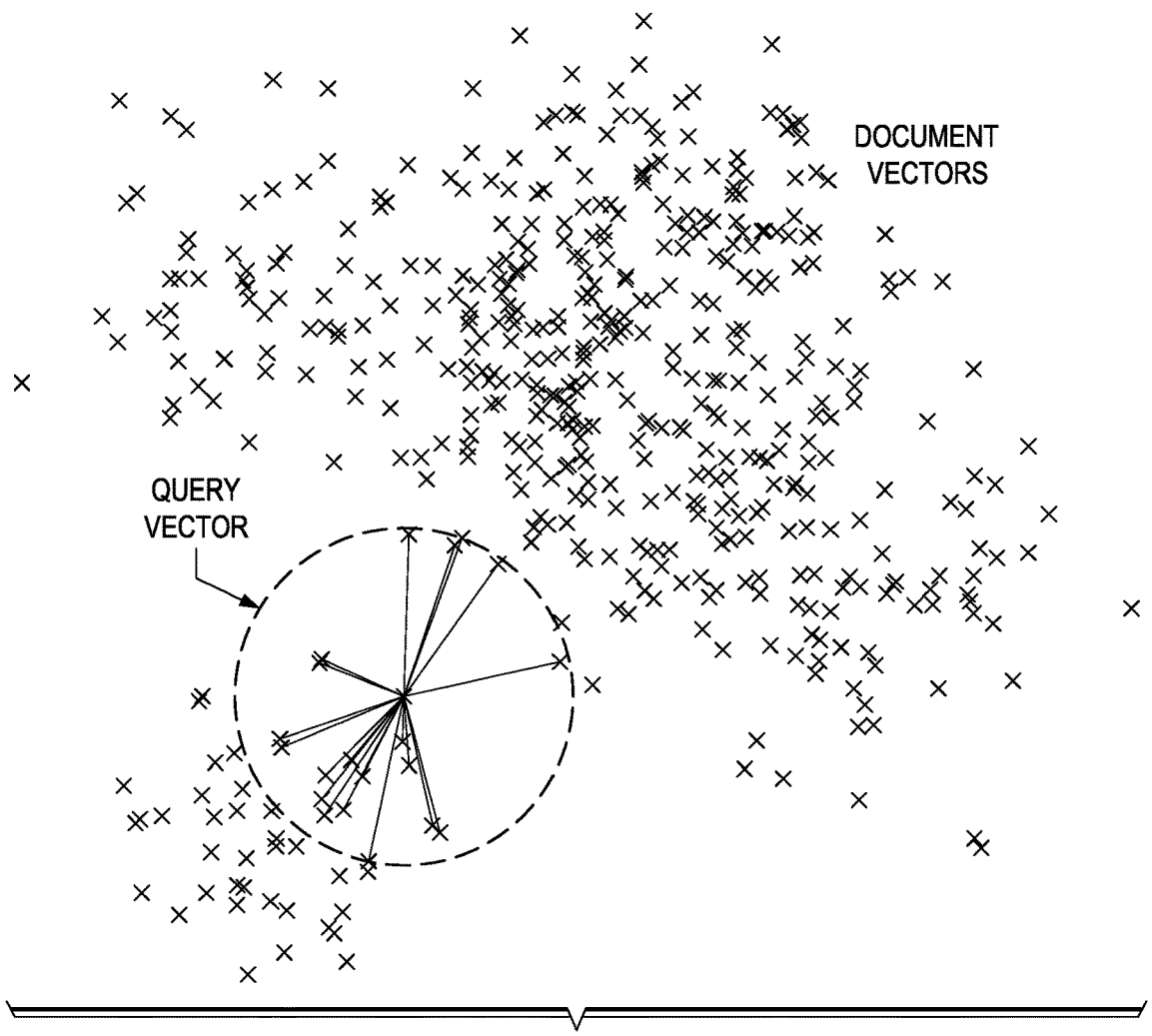
FIG. 6 depicts the n-dimensional semantic query vector applied against a corpus of documents, which are themselves represented by semantic vectors.

FIG. 6 depicts step (3) from FIG. 2, showing the query string being compared to the information previously stored. This operation finds the N document vectors closest to the query vector according to a similarity metric; preferably N is the number of documents returned by the search engine.

Figure 7:
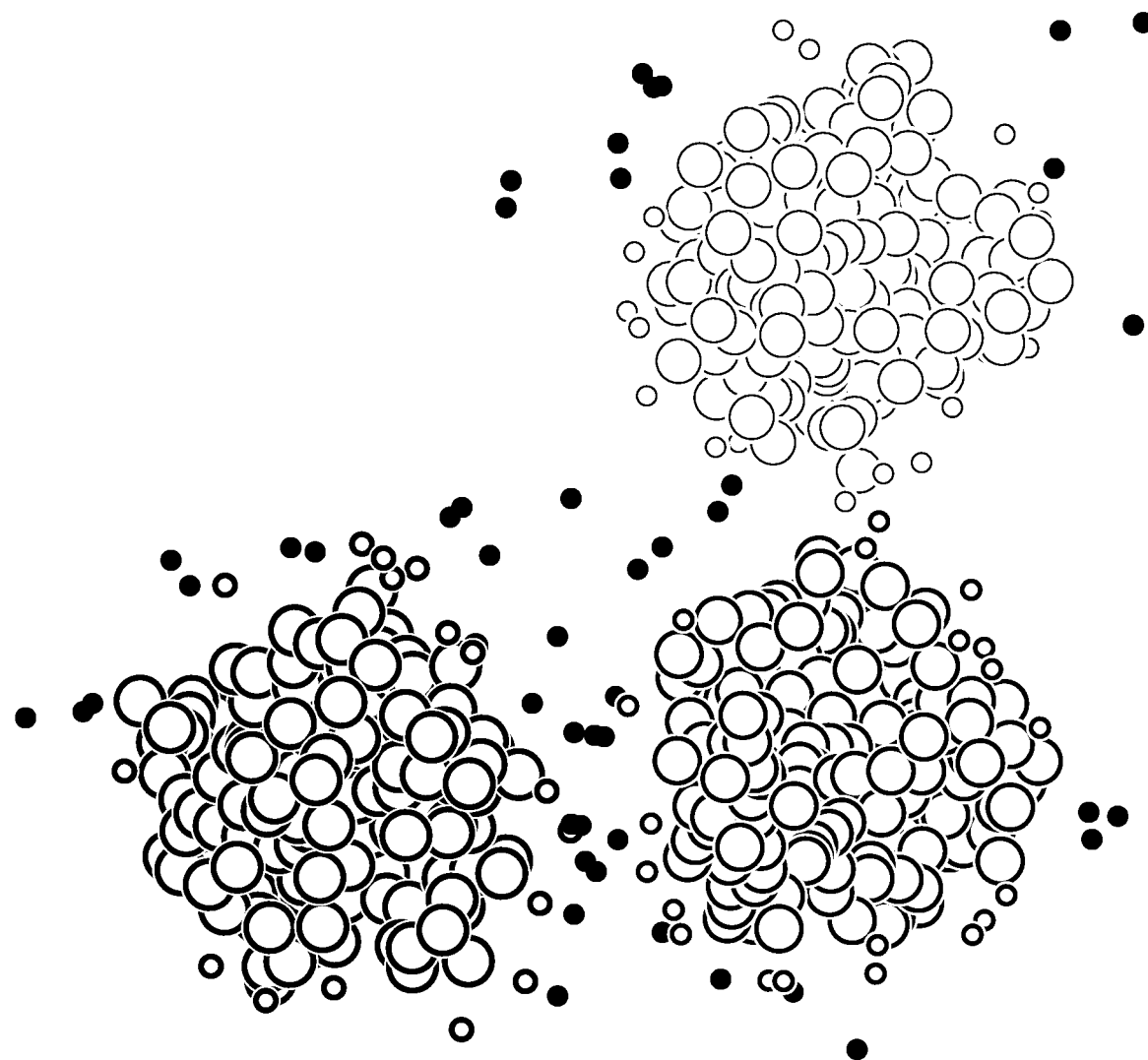
FIG. 7 depicts how groups of documents are organized as clusters.

FIG. 7 depicts various documents embedded in a same N-dimensional vector space. A clustering algorithm, such as DBSCAN, may be used to identify groups of similar documents.

Generalizing, according to the technique herein, preferably any number (including large numbers) of semantic vectors are processed (plotted) across large numbers (potentially thousands) of dimensions with atomic embedding computed by neural indexing, thereby enabling the system to extract very accurate insights (e.g., answers) from the indexed information. Typically, there is a separate n-dimensional vector per passage in a document, where a passage can be sentence- or sub-sentence length. Accordingly, there may be thousands of vectors computed per document, and preferably the vectors represent sentence-level information, including relevant context, synonyms and the like.

The most computationally expensive step in the above-described question answer pipeline is step (5) in FIG. 2, which involves application of a deep learning model (the sentence ranker), which model is sometimes referred to herein as a neural filter. In particular, and with reference to FIG. 8, assume that a user of the system has issued a query; it is assumed that the user's document corpus has been previously indexed, as described above. The first stage of this portion of the Q/A pipeline involves retrieving (e.g., from all of the user's files 800 in the data store) a set of documents 802 related to the user's query, using the semantic embedding vectors. In a typical (but non-limiting example), this first operation returns some percentage (e.g., 0.1%) of the user's documents. While this is a relatively small percentage, each document in turn may include many pages, and thus (even though there is a small percentage of the user's document corpus returned initially), this document set may still comprise a very large number of sentences that could be "answers" to the query. With a large number of sentences, the compute load, storage and network communication requirements are potentially problematic, especially as the system scales. There computation, storage and communication inefficiencies are addressed using a neural filter 804, which is applied to aggressively reduce the amount of data that flows between the initial data store and the question-answering model. In particular, each document 802 returned in the initial set is decomposed (broken) into its constituent sentence(s), with each sentence associated with a semantic embedding vector. The neural filter 804 then acts to select a small number of sentences 808 from the set of sentences 806 derived from the documents 802 that were retrieved in the initial stage, and this filtering operation greatly reduces both the network bandwidth and the final question-answer model's compute load, thereby providing both computational, network communication and storage efficiencies for the Q/A computing system/platform as a whole.

Figure 8:
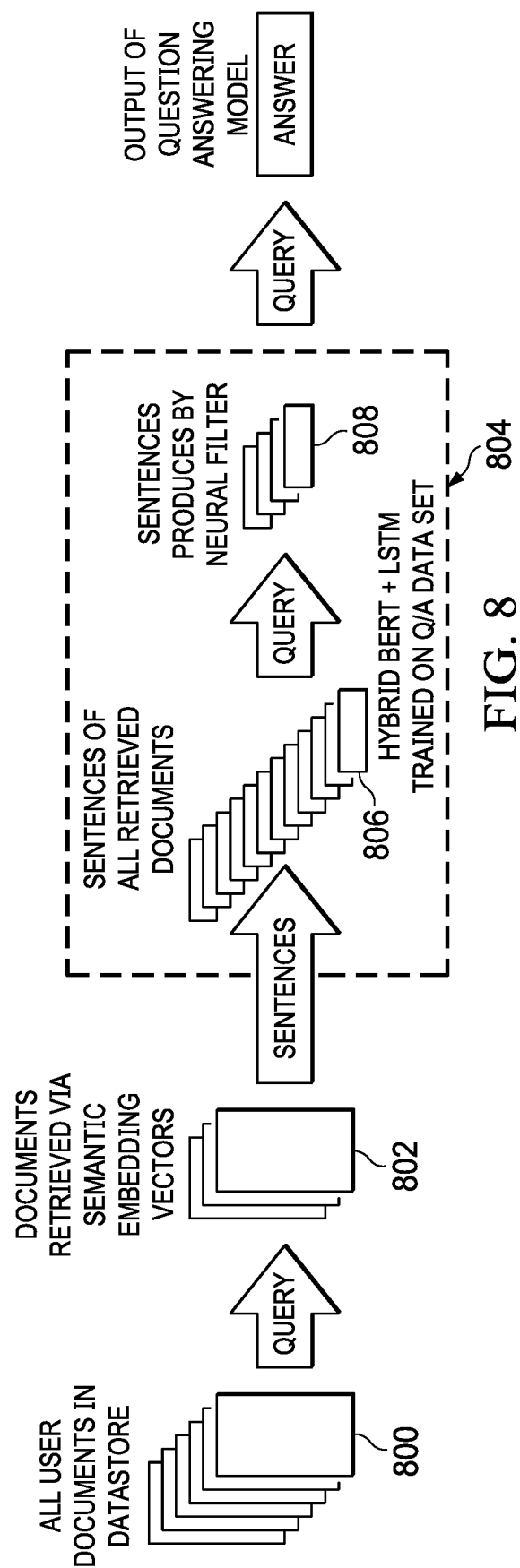
FIG. 8 depicts a neural filter that is configured to provide computation and storage efficiencies for a Q/A computing system.

Thus, and given a user query, the system first returns a relatively small set of the user's documents that might have an answer to the query, and then the neural filter is applied to the sentences within that to identify only those sentences that are then examined to determine a final result. As depicted in FIG. 8, once the small number of sentences 808 is identified by the neural filter, only those sentences 808 are then queried (with the user query) to return the answer. Typically, the answer will identify the document, page and line at which the answer was found.

In one embodiment, the neural filter 804 is a lightweight hybrid Transformer-LSTM (long short-term memory) architecture that is trained on a custom collection of publicly available question-answer data. This data, described below, is aggregated, and formatted for the task. In this embodiment, the model is trained (e.g., using gradient descent) for a number of (e.g., 10) epochs, shuffling examples randomly in each epoch. A cross-entropy loss is then used to compare the model predictions to the ground truth list-wise labels described below. The model achieves extremely fast performance due to its optimized network architecture, e.g., comprising a lightweight four-layer LSTM with a single linear classification layer. Input embeddings are computed using a BERT (Bidirectional Encoder Representations from Transformers) embeddings model, which adds negligible overhead. During training, the cross-entropy loss is back-propagated through the LSTM model as well as the BERT embedding layer. The model is trained on a V100 GPU instance and the best set of hyper-parameters are chosen based on a validation dataset.

Referring back to FIG. 8, during runtime operation the model is trained to take as input a single sentence and the user query, and to produce a rating (e.g., 1 or 0) depending on whether the sentence is likely to contain an answer to the user query. Preferably, and to provide further computational and storage efficiencies, this model is run in parallel across all sentences 806 in the initial retrieved set of documents 802, producing the small number of candidate sentences 808 (typically less than 10) with a rating of 1. These sentences are then passed to the question-answering model API. This filtering approach decreases the overall question-answering runtime by up to 1000%, and it improves accuracy of returning the correct answer by up to 10%. Due to the exceptionally lightweight neural filter architecture, it is run on inexpensive CPU instances. The neural filter reduces the number of parameters of the common BERT model by 75%, which facilitates production scalability.

In one embodiment, the dataset used to train the neural filter is unique from other retrieval-based datasets in that it must teach the model to identify sentences that are highly relevant to a question and likely to contain an answer. In one embodiment, the publicly available question-answer data is obtained from multiple publicly-available sources, e.g., crowdsourced data derived from Wikipedia, open source log data, game show questions and answers augmented with web data, and the like. To this end, the data is structured as list-wise groupings of ten (10) candidate sentences for an example query, with one positive sentence and nine (9) negative sentences per training example. A positive sentence is associated with a high score, and a negative sentence is associated with a low score. The negative sentences are chosen to be maximally contrastive, i.e. they are quasi-relevant to the question but do not contain the answer. This improves the performance of the neural filter in cases where there are high degrees of keyword or lexical overlap between the query and candidate sentences.

The above-described technique and leveraging the neural filter provides significant advantages as compared to traditional vector indexing. The approach uses more compact (shorter) vectors, which vectors encode semantic meaning at the sentence or word level. The approach encodes deeper semantic and syntactic meaning than term vectors, which enables far more accurate information retrieval and answer extraction. The approach described herein can leverage a wide variety of natural language textual data to learn to encode semantic features which may be reused in perpetuity. This training data also assists the models to more accurately identify relevant passages in a text corpus (sentence ranker) and extract answer passages (Q&A answer modules). The neural indexing approach can be used for many different tasks (e.g., search, Q/A, summarization, and the like). The approach is more scalable, and readily integrated with other client applications. The results also are more intuitive and thus more useful. The technique herein enables users to obtain answers (to natural language-based questions) in any type of source file (e.g. document) regardless of location or format. The approach herein provides a new class of search engine powered by a network of neural networks. The technique provides significant performance enhancements (in terms of processing and storage efficiencies, and accuracy/relevance of search results as compared to keyword search utilizing tokens, and vector search using vectors. In one embodiment, the system is implemented as a set of information extraction tools (or, more generally, middleware) to index various types of source materials including, without limitation, text, charts, images, audio, video and metadata. Using content-specific information extraction techniques (unified metadata), the system enables access to concept-level data in large multimedia collections, all within milliseconds. This enables deep search-ability of a corpus of source files, irrespective of their format differences.

The approach herein leverages a novel way to represent and retrieve textual information. Neural networks trained on vast natural language datasets embed document text much more efficiently than classical vector-based representations, and they advantageously retain the semantic meaning of the original source material.

According to this disclosure, semantic vectors (each of a potentially long string of data) encode semantic meaning and preferably are plotted in n-dimensional space. Indeed, there may be thousands of semantic vectors plotted in hundreds to thousands of dimensions. The system finds significant utility for Q/A applications, and it enable true conversational-based search and information retrieval.

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises hardware, an operating system, an application runtime environment, and a set of applications or processes and associated data, that provide the functionality of a given system or subsystem. As described, the functionality may be implemented in a standalone machine, or across a distributed set of machines.

Other enabling technologies for the machine learning algorithms include, without limitation, vector autoregressive modeling (e.g., Autoregressive Integrated Moving Average (ARIMA)), state space modeling (e.g., using a Kalman filter), a Hidden Markov Model (HMM), recurrent neural network (RNN) modeling, RNN with long short-term memory (LSTM), Random Forests, Generalized Linear Models, Extreme Gradient Boosting, Extreme Random Trees, and others. By applying these modeling techniques, new types of features are extracted, e.g., as follows: model parameters (e.g. coefficients for dynamics, noise variance, etc.), latent states, and predicted values for a next couple of observation periods.

Typically, but without limitation, a client device is a mobile device, such as a smartphone, tablet, or wearable computing device, laptop or desktop. A typical mobile device comprises a CPU (central processing unit), computer memory, such as RAM, and a drive. The device software includes an operating system (e.g., Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Each above-described process preferably is implemented in computer software as a set of program instructions executable in one or more processors, as a special-purpose machine.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Each above-described process preferably is implemented in computer software as a set of program instructions executable in one or more processors, as a special-purpose machine.

The techniques herein generally provide for the above-described improvements to a technology (e.g., a Q/A computing system), as well as the specific technological improvements to various fields, all as described above.

What is claimed is as follows:

1. An information and retrieval system, comprising:
computing hardware;
computer software executing on the computer hardware, wherein the computer software is configured to:
  receive a corpus of documents associated with a user, wherein the documents are structured in two or more distinct formats;
  for each document in the corpus, process the document to identify a set of information strings and, for each information string, encode at least a portion of the information string into an n-dimensional semantic vector;
  store the n-dimensional semantic vectors for each document;
  upon receipt of a query, process the query into an n-dimensional semantic query vector;
  compare the n-dimensional semantic query vector against the stored n-dimensional vectors for each document and, in response, identifying a set of candidate n-dimensional vectors that represent a possible answer to the query, wherein identifying the of candidate n-dimensional vectors applies a neural filter that has been trained against a dataset of question-answer data structured as groupings of candidate sentences for an example query, wherein for a given training example the neural filter is trained to identify a particular candidate sentence that includes an answer to the example query while remaining candidate sentences that do not include the answer are characterized by the neural filter as contrasting;
  rank the candidate n-dimensional vectors; and
  return as an answer to the query a data string represented by a given highest ranked candidate n-dimensional vector.

2. The system as described in claim 1 wherein the information string is a sentence, and wherein the n-dimensional semantic vector also includes context information associated with the sentence.

3. The system as described in claim 1 wherein the computer software is further configured to also return as response to the query the document in which the data string occurs.

4. The system as described in claim 1 wherein the document is processed using a neural network.

5. The system as described in claim 1 wherein the candidate n-dimensional vectors are ranked using a neural network.

6. The system as described in claim 1 wherein the highest ranked candidate n-dimensional vector is identified using a neural network.

7. The system as described in claim 1 wherein the computer software is configured as software-as-a-service.

8. The system as described in claim 1 wherein the system is configured on-premises, in a cloud deployment, or in a hybrid on-premises and cloud deployment.

9. The system as described in claim 1 wherein there a large number of n-dimensional semantic vectors per document.

10. The system as described in claim 1 wherein the query is received as a natural language query.

11. The system as described in claim 1 wherein the computer software is further configured to cluster groups of documents.

12. The system as described in claim 1 wherein the documents are text, spreadsheets, slide presentations, and information output from an Optical Character Reader (OCR).

13. The system as described in claim 1 configured for first and second distinct enterprises.

14. The system as described in claim 1 wherein the neural filter comprises a hybrid transformer-LSTM (long short-term memory) architecture.

15. An information and retrieval system, comprising:
computing hardware;
computer software executing on the computer hardware, wherein the computer software is configured to:
  receive a corpus of documents associated with a user, wherein the documents are structured in two or more distinct formats;
  for each document in the corpus, process the document to identify a set of information strings and, for each information string, encode at least a portion of the information string into an n-dimensional semantic vector;
  store the n-dimensional semantic vectors for each document;
  upon receipt of a query, process the query into an n-dimensional semantic query vector;
  compare the n-dimensional semantic query vector to all documents to retrieve a subset of the documents;
  breaking each document in the subset of the documents into a set of constituent sentences;

applying the constituent sentences of the subset of the documents through a neural filter to identify a subset of the constituent sentences, the neural filter having been trained against a dataset of question-answer data structured as groupings of candidate sentences for an example query, wherein for a given training example the neural filter is trained to identify a particular candidate sentence that includes an answer to the example query while remaining candidate sentences that do not include the answer are characterized by the neural filter as contrasting;

rank the subset of the constituent sentences; and return as an answer to the query a data string represented by a given highest ranked constituent sentence.

16. The information and retrieval system as described in claim 15 wherein the neural filter comprises a hybrid transformer-LSTM (long short-term memory) architecture.

17. The information and retrieval system as described in claim 15 wherein the query is received as a natural language query.

18. The information and retrieval system as described in claim 15 wherein the neural filter executes against the constituent sentences in parallel.

* * * * *